(12) United States Patent
Sahoo et al.

(10) Patent No.: US 9,728,208 B2
(45) Date of Patent: *Aug. 8, 2017

(54) METHODS OF FORMING MATERIALS FOR AT LEAST A PORTION OF A NFT AND NFTS FORMED USING THE SAME

(71) Applicant: SEAGATE TECHNOLOGY LLC, Cupertino, CA (US)

(72) Inventors: Sarbeswar Sahoo, Shakopee, MN (US); Tong Zhao, Eden Prairie, MN (US); Michael C. Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,288

(22) Filed: Dec. 17, 2015

(65) Prior Publication Data

US 2016/0210989 A1    Jul. 21, 2016

Related U.S. Application Data

(63) Continuation of application No. 14/313,504, filed on Jun. 24, 2014, now Pat. No. 9,245,573.

(60) Provisional application No. 61/838,397, filed on Jun. 24, 2013.

(51) Int. Cl.
| | | |
|---|---|---|
| *G11B 5/31* | (2006.01) | |
| *G11B 13/08* | (2006.01) | |
| *G11B 5/48* | (2006.01) | |
| *G11B 7/1387* | (2012.01) | |
| *G11B 5/60* | (2006.01) | |

(Continued)

(52) U.S. Cl.
CPC ............ *G11B 5/314* (2013.01); *G11B 5/1272* (2013.01); *G11B 5/3163* (2013.01); *G11B 5/4866* (2013.01); *G11B 5/6088* (2013.01); *G11B 7/1387* (2013.01); *G11B 13/08* (2013.01); *G11B 2005/0021* (2013.01)

(58) Field of Classification Search
CPC .......... G11B 5/4866; G11B 2005/0021; G11B 5/314; G11B 5/6088; G11B 2005/001; G11B 7/1387; G11B 5/3133; G11B 13/08; G11B 5/3163
USPC ............................................ 369/13.33, 13.13
See application file for complete search history.

(56) References Cited

U.S. PATENT DOCUMENTS

| | | |
|---|---|---|
| 3,906,791 A | 9/1975 | Lynnworth |
| 4,492,873 A | 1/1985 | Dmitriev |
| 5,472,777 A | 12/1995 | Kineri |

(Continued)

FOREIGN PATENT DOCUMENTS

| | | |
|---|---|---|
| EP | 024088 | 10/1987 |
| EP | 0 580 368 A2 | 1/1994 |

(Continued)

OTHER PUBLICATIONS

U.S. Appl. No. 13/923,925, filed Jun. 21, 2013, Pitcher.

(Continued)

*Primary Examiner* — Ali Neyzari
(74) *Attorney, Agent, or Firm* — Mueting, Raasch & Gebhardt, P.A.

(57) ABSTRACT

A method including depositing a plasmonic material at a temperature of at least 150° C.; and forming at least a peg of a near field transducer (NFT) from the deposited plasmonic material.

20 Claims, 6 Drawing Sheets

(51) Int. Cl.
*G11B 5/127* (2006.01)
*G11B 5/00* (2006.01)

(56) References Cited

U.S. PATENT DOCUMENTS

| | | |
|---|---|---|
| 5,482,611 A | 1/1996 | Helmer |
| 5,849,093 A | 12/1998 | Andra |
| 5,945,681 A | 8/1999 | Tokiguchi |
| 6,130,436 A | 10/2000 | Renau |
| 6,144,098 A | 11/2000 | Iyer |
| 6,589,676 B1 | 7/2003 | Gui |
| 6,632,483 B1 | 10/2003 | Callegari |
| 6,641,932 B1 | 11/2003 | Xu |
| 6,683,426 B1 | 1/2004 | Kleeven |
| 6,738,141 B1 | 5/2004 | Thirstrup |
| 6,795,630 B2 | 9/2004 | Challener |
| 6,999,384 B2 | 2/2006 | Stancil |
| 7,002,228 B2 | 2/2006 | Deak |
| 7,018,729 B2 | 3/2006 | Pocker |
| 7,032,427 B2 | 4/2006 | Niwa |
| 7,262,936 B2 | 8/2007 | Hamann |
| 7,272,079 B2 | 9/2007 | Challener |
| 7,330,404 B2 | 2/2008 | Peng |
| 7,377,228 B2 | 5/2008 | Mack |
| 7,419,912 B2 | 9/2008 | Donofrio |
| 7,476,855 B2 | 1/2009 | Huang |
| 7,538,978 B2 | 5/2009 | Sato |
| 7,544,958 B2 | 6/2009 | Low |
| 7,609,003 B2 | 10/2009 | Horsky |
| 7,690,009 B2 | 3/2010 | Miyanishi |
| 7,759,609 B2 | 7/2010 | Asscher |
| 7,791,839 B2 | 9/2010 | Olson |
| 7,961,417 B2 | 6/2011 | Seigler |
| 7,965,464 B2 | 6/2011 | Batra |
| 7,986,592 B2 | 7/2011 | Hirano |
| 8,023,225 B2 | 9/2011 | Shimazawa |
| 8,031,561 B2 | 10/2011 | Hellwing |
| 8,040,761 B2 | 10/2011 | Kawamori |
| 8,077,556 B2 | 12/2011 | Komura |
| 8,107,325 B2 | 1/2012 | Komura |
| 8,116,034 B2 | 2/2012 | Komura |
| 8,116,176 B2 | 2/2012 | Kato |
| 8,194,510 B2 | 6/2012 | Sasaki |
| 8,194,511 B2 | 6/2012 | Sasaki |
| 8,213,272 B2 | 7/2012 | Takayama |
| 8,223,597 B2 | 7/2012 | Komura |
| 8,248,891 B2 | 8/2012 | Lee |
| 8,284,521 B2 | 10/2012 | Ohtsu |
| 8,284,635 B2 | 10/2012 | Matsumoto |
| 8,289,650 B2 | 10/2012 | Seigler |
| 8,320,220 B1 | 11/2012 | Yuan |
| 8,325,567 B2 | 12/2012 | Miyauchi |
| 8,331,205 B2 | 12/2012 | Seigler |
| 8,339,740 B2 | 12/2012 | Zou |
| 8,351,151 B2 | 1/2013 | Katine |
| 8,385,159 B2 | 2/2013 | Gao |
| 8,400,902 B2 | 3/2013 | Huang |
| 8,405,056 B2 | 3/2013 | Amaldi |
| 8,405,932 B2 | 3/2013 | Seigler |
| 8,416,647 B1 | 4/2013 | Zhao |
| 8,427,925 B2 | 4/2013 | Zhao |
| 8,451,555 B2 | 5/2013 | Seigler |
| 8,451,705 B2 | 5/2013 | Peng et al. |
| 8,477,454 B2 | 7/2013 | Zou |
| 8,514,673 B1 | 8/2013 | Zhao |
| 8,553,505 B2 | 10/2013 | Rawat |
| 8,670,215 B2 | 3/2014 | Zou |
| 8,675,457 B1 | 3/2014 | Hirata |
| 8,711,662 B2 | 4/2014 | Lee |
| 8,773,959 B2 | 7/2014 | Gao et al. |
| 8,830,800 B1 | 9/2014 | Pitcher |
| 8,897,105 B1 | 11/2014 | Zuckerman |
| 8,917,581 B1 | 12/2014 | Mallary |
| 8,934,198 B2 | 1/2015 | Zou |
| 8,958,168 B1 | 2/2015 | Yuan |
| 9,058,824 B2* | 6/2015 | Cheng ................. G11B 5/4866 |
| 9,129,626 B2 | 9/2015 | Kautzky |
| 9,245,573 B2* | 1/2016 | Sahoo .................. G11B 5/314 |
| 2005/0012052 A1 | 1/2005 | Platzgummer |
| 2005/0189329 A1 | 9/2005 | Talwar |
| 2005/0190496 A1 | 9/2005 | Hamann |
| 2006/0238133 A1 | 10/2006 | Horsky |
| 2007/0012950 A1 | 1/2007 | Cain |
| 2007/0019028 A1 | 1/2007 | Renn |
| 2007/0069383 A1 | 3/2007 | Suzuki |
| 2007/0207335 A1 | 9/2007 | Karandikar |
| 2008/0056080 A1 | 3/2008 | Milster |
| 2008/0230724 A1 | 9/2008 | Low |
| 2009/0073858 A1 | 3/2009 | Seigler |
| 2009/0130365 A1 | 5/2009 | Kojima |
| 2009/0225636 A1 | 9/2009 | Hirano |
| 2010/0103553 A1 | 4/2010 | Shimazawa |
| 2010/0123965 A1 | 5/2010 | Lee |
| 2010/0123967 A1 | 5/2010 | Batra |
| 2010/0128579 A1 | 5/2010 | Seigler |
| 2010/0149930 A1 | 6/2010 | Komura |
| 2010/0157746 A1 | 6/2010 | Hongo |
| 2010/0190036 A1 | 7/2010 | Komvopoulos |
| 2010/0214685 A1 | 8/2010 | Seigler |
| 2010/0309581 A1 | 12/2010 | Wu |
| 2010/0315736 A1 | 12/2010 | Takayama |
| 2010/0320403 A1 | 12/2010 | Amaldi |
| 2010/0329085 A1 | 12/2010 | Kawamori |
| 2011/0006214 A1 | 1/2011 | Bonig |
| 2011/0026161 A1 | 2/2011 | Ikeda |
| 2011/0038236 A1 | 2/2011 | Mizuno |
| 2011/0044857 A1 | 2/2011 | Lin |
| 2011/0058272 A1 | 3/2011 | Miyauchi |
| 2011/0096431 A1 | 4/2011 | Hellwig |
| 2011/0122735 A1 | 5/2011 | Kato |
| 2011/0205863 A1 | 8/2011 | Zhao |
| 2011/0286127 A1 | 11/2011 | Gao |
| 2012/0039155 A1 | 2/2012 | Peng |
| 2012/0045662 A1 | 2/2012 | Zou |
| 2012/0105996 A1 | 5/2012 | Katine |
| 2012/0127839 A1 | 5/2012 | Rawat |
| 2012/0138937 A1 | 6/2012 | Jo |
| 2012/0201491 A1 | 8/2012 | Zhou |
| 2012/0213042 A1 | 8/2012 | Aoki |
| 2013/0107679 A1 | 5/2013 | Huang |
| 2013/0108212 A1 | 5/2013 | Peng |
| 2013/0161505 A1 | 6/2013 | Pitcher |
| 2013/0164453 A1 | 6/2013 | Pitcher |
| 2013/0164454 A1 | 6/2013 | Pitcher |
| 2013/0176839 A1 | 7/2013 | Peng |
| 2013/0235707 A1 | 9/2013 | Zhao |
| 2013/0276877 A1 | 10/2013 | Dionne |
| 2013/0279035 A1 | 10/2013 | Peng |
| 2013/0279315 A1 | 10/2013 | Zhao |
| 2013/0286799 A1 | 10/2013 | Zhu |
| 2013/0286804 A1 | 10/2013 | Zhao |
| 2013/0288077 A1 | 10/2013 | Dhawan |
| 2014/0004384 A1 | 1/2014 | Zhao |
| 2014/0043948 A1 | 2/2014 | Hirata |
| 2014/0050057 A1 | 2/2014 | Zou |
| 2014/0050058 A1 | 2/2014 | Zou |
| 2014/0113160 A1 | 4/2014 | Pitcher |
| 2014/0177405 A1 | 6/2014 | Rejda |
| 2014/0254335 A1 | 9/2014 | Gage |
| 2014/0302255 A1 | 10/2014 | Spicer |
| 2014/0376346 A1 | 12/2014 | Sahoo |
| 2014/0376347 A1 | 12/2014 | Brons et al. |
| 2014/0376349 A1 | 12/2014 | Cheng |
| 2014/0376350 A1 | 12/2014 | Cheng |
| 2014/0376351 A1 | 12/2014 | Cheng |
| 2014/0376352 A1 | 12/2014 | Cheng |
| 2015/0132503 A1 | 5/2015 | Kautzky |
| 2015/0162028 A1* | 6/2015 | Jayashankar ......... G11B 5/314 427/526 |
| 2015/0179194 A1 | 6/2015 | Cheng |
| 2015/0340052 A1* | 11/2015 | Sankar ................. G11B 5/6088 369/13.33 |

(56) References Cited

U.S. PATENT DOCUMENTS

2016/0133279 A1* 5/2016 Zhao .................. G11B 5/314
                                                          252/71

FOREIGN PATENT DOCUMENTS

| EP | 0942072 | 9/1999 |
|---|---|---|
| EP | 1328027 | 7/2003 |
| EP | 2106678 | 10/2009 |
| JP | 2011198450 | 10/2011 |
| JP | 20111238991 | 12/2011 |
| TW | 200929183 | 7/2009 |
| WO | WO 97/45834 | 12/1997 |
| WO | WO 2013/163195 | 10/2013 |
| WO | WO 2013/163470 | 10/2013 |

OTHER PUBLICATIONS

U.S. Appl. No. 14/561,840, filed Dec. 5, 2014, Jayashankar.
U.S. Appl. No. 14/561,825, filed Dec. 5, 2014, Jayashankar.
Al-Bayati et al., Junction Profiles of Sub keV Ion Implantation for Deep Sub-Quarter Micron Devices, *IEEE*, 2000, pp. 87-90.
Angel et al., "Enhanced Low Energy Drift-Mode Beam Currents in a High Current Ion Implanter," *IEEE*, 1999, pp. 219-222.
Bannuru et al., "The Electrical and Mechanical Properties of Au-V and Au-V2O5 Thin Films for Wear-Resistant RF MEMS Switches", *Journal of Applied Physics*, 103, (2008), pp. 083522-1-083522-6.
Druz et al., "Diamond-Like Carbon Films Deposited Using a Broad, Uniform Ion Beam from an RF Inductively Coupled CH4-Plasma Source", Diamond and Related Materials, vol. 7, No. 7, Jul. 1998, pp. 965-972.
Liu et al., "Influence of the Incident Angle of Energetic Carbon Ions on the Properties of Tetrahedral Amorphous Carbon (ta-C) films", *Journal of Vacuum Science and Technology*, vol. 21, No. 5, Jul. 25, 2003, pp. 1665-1670.
Metallization: "Metallization"; chapter 5, In: Kris v. Srikrishnan and Geraldine C. Schwartz: "Handbook of Semiconductor Interconnection Technology, Second Edition", 2006, CRC Press, Boca Raton, FL, USA, XP002711255, ISBN:978-1-4200-1765-6, pp. 311-382, Section 5.4.1.2 Adhesion; p. 320.
Piazza et al., "Large Area Deposition of Hydrogenated Amorphous Carbon Films for Optical Storage Disks", Diamond and Related Materials, vol. 13, No. 4-8, Apr. 2004, pp. 1505-1510.
Robertson, J., "Diamond-Like Amorphous Carbon," *Materials Science and Engineering R* 37, 2002, pp. 129-281.
Satoh et al., "Evaluation of Adhesion Materials for Gold Line-and-Space Surface Plasmon Antenna on SO1-MOS Photodiode", Silicon Nanoelectronics Workshop (SNW), 2010, IEEE, Piscataway, NJ, USA, Jun. 13, 2010, pp. 1-2.
Vogt, K.W. et al., "Characterization of Thin Titanium Oxide Adhesion Layers on Gold Resistivity, Morphology, and Composition", *Surface Science*, North-Holland, Amsterdam, NL, vol. 301, No. 1-3, Jan. 10, 1994, pp. 203-213.
Williams, et al., "Strengthening Gold Films with Zirconia Nanoparticles for MEMS Electrical Contacts", *ScienceDirect*, Acta Materialia 56, (2008), pp. 1813-1819.
PCT/US2013/038120 Search Report and Written Opinion dated Jul. 19, 2013 (8 pages).
PCT International Search Report and Written Opinion for PCT/US2015/059671 dated Mar. 31, 2016 (12 pages).
Challener et al., "Heat-Assisted Magnetic Recording by a Near-Field Transducer with Efficient Optical Energy Transfer," *Journal of Applied Physics*, Mar. 22, 2009.
Weller et al., "A HAMR Media Technology Roadmap to an Areal Density of 4 Tb/in$^2$", *IEEE Transactions on Magnetics*, vol. 50, No. 1, Jan. 2014.
Chen et al., "Drude Relaxation Rate in Grained Gold Nanoantennas," *Nano Letters*, 2010, 10, 916-922.
Chen et al., "Enhanced Thermal Stability of Silica-Coated Gold Nanorods for Photoacoustic Imaging and Image-Guided Therapy," *Optics Express*, Apr. 26, 2010, vol. 18, No. 9.
Feng et al., "Prediction of Size Effect on Thermal Conductivity of Nanoscale Metallic Films," *Thin Solid Films*, 517 (2009), 2803-2807.
Greer et al., "Nanoscale Gold Pillars Strengthened Through Dislocation Starvation," *Physical Review*, B 73, 245410 (2006).
Hau-Riege et al., "Simulation of Microstructural Evolution Induced by Scanned Laser Annealing of Metallic Interconnects," *Journal of Electronic Materials*, vol. 30, No. 1, 2001.
Huang et al., "Universal and Non-Universal Aspects of Wet Granular Matter Under Vertical Vibrations," *Eur. Phys. J. Special Topics*, 179, 25-32 (2009).
Huang, "Pulsed Laser Photothermal Annealing and Ablation of Plasmonic Nanoparticles", *European Physical Journal Special Topics*, 2008, 153, 223-230.
Matsumura et al., "Advanced Excimer-Laser Annealing Process for Quasi Single-Crystal Silicon Thin-Film Devices," *Thin Solid Films*, 337, (1999), 123-128.
Rost et al., "Grains, Growth and Grooving", *Physical Review Letters*, vol. 91, No. 2, Jul. 11, 2003.
Webster's Ninth New Collegiate Dictionary; Merriam-Webster incorporated, publishers: Springfield, Massachusetts, USA; excerpt pp. 867-868.
Lerner, editor: Encyclopedia of Physics, second edition, excerpt by Chang et al., "Plasmons" on pp. 936-937, VCH Publishers, Inc., New York, 1991 (no. month).

* cited by examiner

FIG. 6A
FIG. 6B
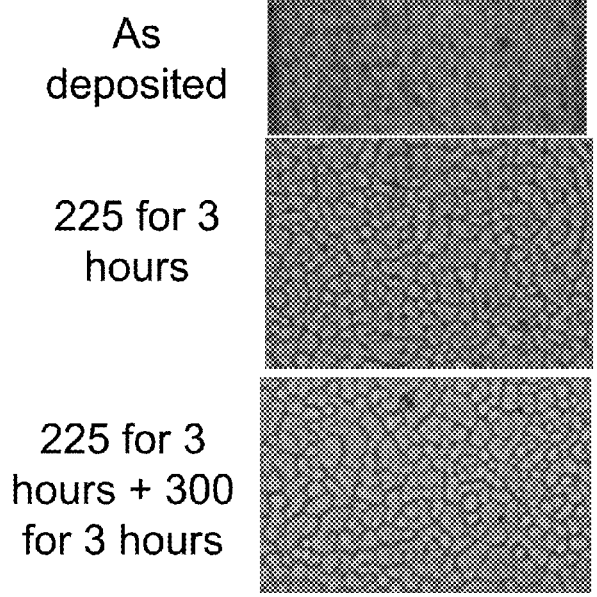
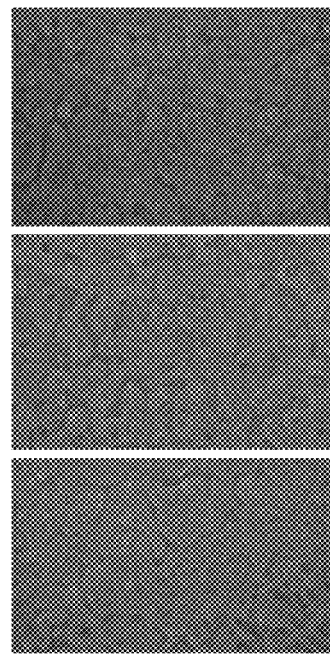
As deposited
225 for 3 hours
225 for 3 hours + 300 for 3 hours

METHODS OF FORMING MATERIALS FOR AT LEAST A PORTION OF A NFT AND NFTS FORMED USING THE SAME

PRIORITY

This application is a continuation application of U.S. application Ser. No. 14/313,504 entitled METHODS OF FORMING MATERIALS FOR AT LEAST A PORTION OF A NFT AND NFTS FORMED USING THE SAME, filed Jun. 24, 2014, and which claims priority to U.S. Provisional Application No. 61/838,397 entitled "METHODS OF FORMING AU AND AU ALLOYS" filed on Jun. 24, 2013, the disclosure of which is incorporated herein by reference thereto.

SUMMARY

Disclosed are methods including depositing a plasmonic material at a temperature of at least 150° C.; and forming at least a peg of a near field transducer (NFT) from the deposited plasmonic material.

Also disclosed are near field transducers (NFTs) that includes a peg, the peg having an average grain size of not less than 75 nm.

Also disclosed are methods that include depositing a plasmonic material at a temperature of at least 150° C.; and forming at least a peg of a near field transducer (NFT) from the deposited plasmonic material, wherein neither the deposited material is annealed nor the peg is annealed once formed, and the peg has an average grain size of not less than 50 nm.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

FIGS. 6A and 6B show AFM images of room temperature deposited grains (FIG. 6A) and 190° C. deposited grains (FIG. 6B).

(FIG. 8C).

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more.

The very high temperatures that the NFT reaches during operation can lead to diffusion of the material of the NFT (for example gold) from the peg and towards the disk. In addition, a portion of the NFT may be exposed at the air bearing surface of the recording head and is thus subject to mechanical wearing. NFT performance is greatly influenced by the heat and mechanical stress during HAMR operation. It would therefore be advantageous to have NFT devices that are more durable.

Disclosed devices can offer the advantage of providing more efficient transfer of energy from an energy source to the magnetic storage media to be heated, a smaller focal point at the point of heating, or some combination thereof. In some embodiments, disclosed devices can be used within other devices or systems, such as magnetic recording heads, more specifically, thermally or heat assisted magnetic recording (HAMR) heads, or disc drives that include such devices.

Figure 1:
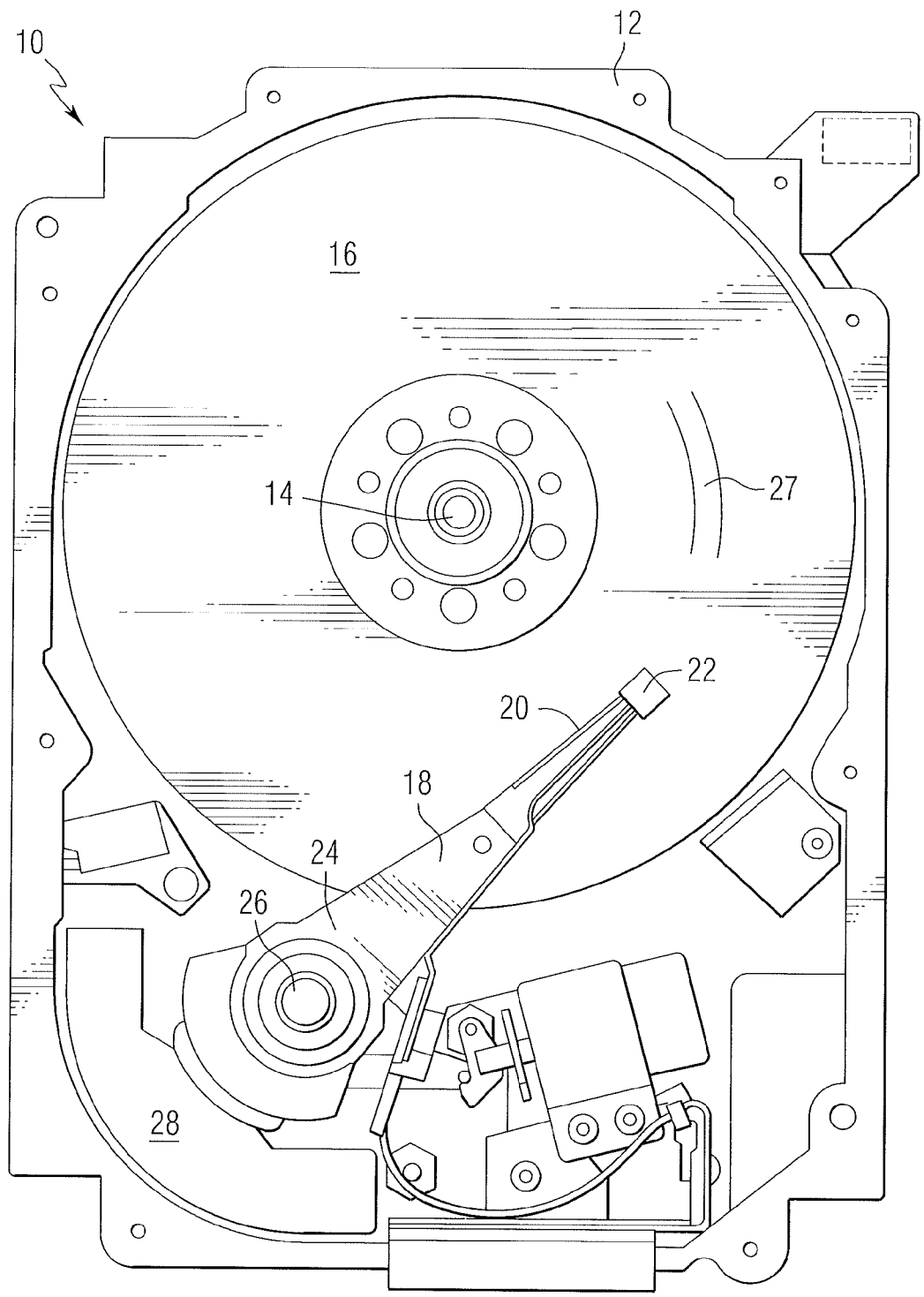
FIG. 1 is a pictorial representation of a data storage device in the form of a disc drive that can include a recording head constructed in accordance with an aspect of this disclosure.

Disclosed herein are NFTs and devices that include such NFTs. FIG. 1 is a pictorial representation of a data storage device in the form of a disc drive 10 that can utilize disclosed NFTs. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art. The storage media may include, for example, continuous media or bit patterned media.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light toward the storage media and a near field transducer to focus the light to a spot size smaller than the diffraction limit. While FIG.

1 shows a disc drive, disclosed NFTs can be utilized in other devices that include a near field transducer.

Figure 2:
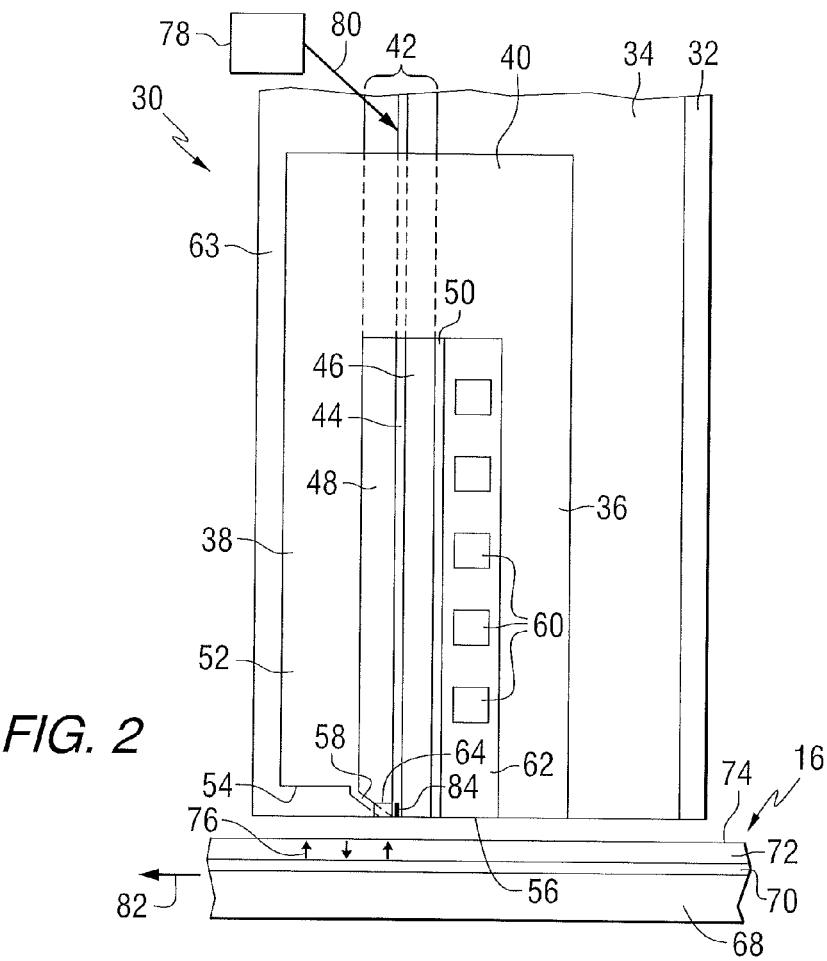
FIG. 2 is a side elevation view of a recording head constructed in accordance with an aspect of the invention.

FIG. 2 is a side elevation view of a recording head that may include a disclosed NFT; the recording head is positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 is positioned adjacent to the sloped pole piece 58. The heat sink can be comprised of a non-magnetic material, such as for example Au.

As illustrated in FIG. 2, the recording head 30 includes a structure for heating the magnetic storage media 16 proximate to where the write pole 58 applies the magnetic write field H to the storage media 16. In this example, the media 16 includes a substrate 68, a heat sink layer 70, a magnetic recording layer 72, and a protective layer 74. However, other types of media, such as bit patterned media can be used. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Specific exemplary types of light sources 78 can include, for example laser diodes, light emitting diodes (LEDs), edge emitting laser diodes (EELs), vertical cavity surface emitting lasers (VCSELs), and surface emitting diodes. In some embodiments, the light source can produce energy having a wavelength of 830 nm, for example. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. A near-field transducer (NFT) 84 is positioned in or adjacent to the waveguide and at or near the air bearing surface. The heat sink material may be chosen such that it does not interfere with the resonance of the NFT.

Although the example of FIG. 2 shows a perpendicular magnetic recording head and a perpendicular magnetic storage media, it will be appreciated that the disclosure may also be used in conjunction with other types of recording heads and/or storage media where it may be desirable to concentrate light to a small spot.

Figures 3, 4:
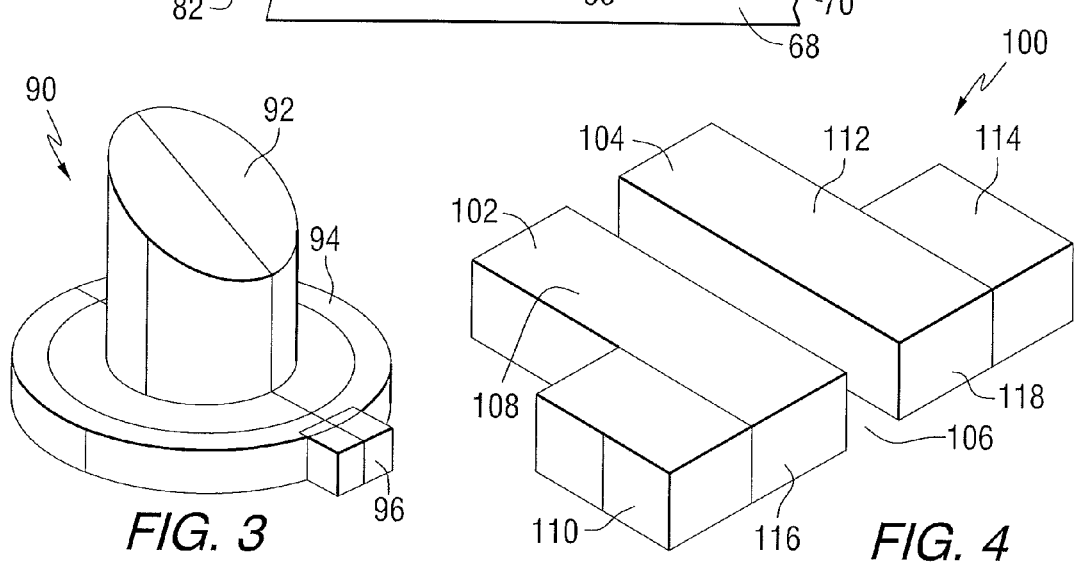
FIG. 3 is a schematic representation of a near field transducer.
FIG. 4 is a schematic representation of another near field transducer.

FIG. 3 is a schematic view of a lollypop NFT 90 in combination with a heat sink 92. The NFT includes a disk shaped portion 94 and a peg 96 extending from the disk shaped portion. The heat sink 92 can be positioned between the disk shaped portion and the sloped portion of the top pole in FIG. 2. When mounted in a recording head, the peg may be exposed at the ABS and thus can be subjected to mechanical wearing.

FIG. 4 is a schematic view of a coupled nanorod (CNR) NFT 100. This NFT includes two nanorods 102 and 104 separated by a gap 106. Nanorod 102 includes a first portion 108 and a second portion 110. Nanorod 104 includes a first portion 112 and a second portion 114. When mounted in a recording head, the ends 116 and 118 of the nanorods may be exposed at the ABS and thus be subject to mechanical wearing. FIGS. 3 and 4 show example NFTs. However, the disclosure is not limited to any particular type of NFT. The materials described below may be used in various NFT configurations.

Typical methods of forming NFTs include room temperature sputter deposition of a film followed by an annealing step before the film is patterned into a peg of a NFT (the disk of a NFT may not necessarily typically be annealed). The most common mechanism of NFT failure is peg recession when the NFT is subjected to high operating temperatures. Although the exact origin of peg recession is yet to be understood, the current hypotheses point to several sources of vacancies in peg/disc materials. The sources of vacancies could originate from trapped voids or micro-pores during film growth and the presence of grain boundaries. During high temperature HAMR operation, large grain growth of the NFT peg and disk have been observed, possibly at the expense of these sources of vacancies such voids and grain boundaries. Another aspect of NFT failure is believed to be related to growth induced stress in the NFT during peg and disk deposition. Growth induced stress adds to all other sources of stress such as stress due to peg patterning, stress due to surrounding dielectrics and slider processes for example. Aggregated stress induced NFT failure may be detrimental at the high temperatures at which HAMR operates.

Disclosed herein are methods of forming NFTs that may serve to address the problems noted above. Disclosed methods deposit the materials that will ultimately become the NFT at higher temperatures. The higher deposition temperatures can be close to or in some embodiments even above HAMR operating temperatures, but still within thermal constraints imposed by other structures or materials within the head. Deposition of the NFT material at high temperatures can increase the probability of having fewer grains, grains having larger dimensions, or both making up the peg. In some embodiments, deposition of the NFT material at high temperatures can mores specifically increase the probability of having fewer grains, e.g., one or two, in the peg whose length is on the order of 50 to 100 nm. Reducing the number of grains, increasing the dimensions of the grain, or both may decrease the number of grain boundaries that can act as a source of vacancies, and may therefore decrease peg recession at high temperatures.

In some embodiments, materials that will become a NFT, or a peg (or rod) of a NFT can be deposited at temperatures of not less than 25° C., in some embodiments not less than 50° C., in some embodiments not less than 100° C., in some embodiments not less than 150° C., in some embodiments not less than 175° C., in some embodiments not less than 180° C., in some embodiments not less than 195° C., or in some embodiments not less than 220° C. In some embodiments, materials that will become a NFT, or a peg (or rod) of a NFT can be deposited at temperatures of not greater than 225° C. Deposition at a noted temperature means that the substrate upon which deposition is occurring is being maintained at the noted temperature.

In some embodiments, the material that will become a NFT, or a peg (or rod) of a NFT can be deposited using sputter deposition, ion-beam deposition, evaporation, molecular beam epitaxy, or chemical vapor deposition for example. Appropriate deposition conditions, such as power, pressure (or gas flow), or substrate temperature for example, can be chosen such that the film has low stress, good within wafer thickness uniformity, and low roughness for example.

Materials deposited using high temperature thickness can have advantageous properties regardless of the thickness of the layer deposited. It should be noted that experimental results are shown below for films having thicknesses of about 150 nm, but the properties exhibited by such films would be expected to be seen in films having any thickness.

In some embodiments various materials can be utilized for NFTs (pegs, rods, disks, or any combination thereof). In some embodiments, the material may be a plasmonic material or an alloy thereof. In some embodiments, the material may be gold (Au), silver (Ag), copper (Cu), aluminum (Al), or any one of those with a secondary element alloyed or doped therein. In some embodiments, the material may be gold (Au), for example. In some embodiments, the materials for a NFT (pegs, rods, disks, or any combination thereof) can include those found in In some embodiments, the secondary atom can include those disclosed in U.S. Pat. No. 8,427,925, U.S. Patent Publication Number 20140050057, U.S. patent application Ser. No. 13/923,925 entitled MAGNETIC DEVICES INCLUDING FILM STRUCTURES, U.S. patent application filed on the same day herewith having docket number 430.18004010 entitled MATERIALS FOR NEAR FIELD TRANSDUCERS AND NEAR FIELD TRANSDUCERS CONTAINING SAME, U.S. patent application filed on the same day herewith having docket number 430.18344010 entitled MATERIALS FOR NEAR FIELD TRANSDUCERS AND NEAR FIELD TRANSDUCERS CONTAINING SAME, and U.S. patent application filed on the same day herewith having docket number 430.18017010 entitled MATERIALS FOR NEAR FIELD TRANSDUCERS AND NEAR FIELD TRANSDUCERS CONTAINING SAME, the entire disclosures of which are all incorporated herein by reference thereto. In one embodiment that employs solid solution hardening. Au is co-sputtered with one of the following elements: Cu, Rh, Ru, V or Zr, or an Au alloy is deposited directly from an alloy target, on Si substrates at room temperature. The doping level varies between 0.5% and 30% and the film thickness varies between 150 nm and 300 nm. The Au alloy may include Au and at least one of: Cu, Rh, Ru, Ag, Ta, Cr, Al, Zr, V, Pd, Ir, Co, W, Ti, Mg, Fe and Mo. In other embodiments, the film thickness can be as low as 10 nm. Considering the impact on NFT coupling efficiency, in some embodiments, the maximum doping levels have been determined to be 30% for Cu, 2% for Rh, and 1% for Ru.

In some embodiments, a material that will become a NFT, or a peg (or rod) of a NFT can be deposited on a seed layer for example. Use of a seed layer can control surface morphology and reduce surface roughness. Illustrative materials for seed layers can include zirconium nitride (ZrN), titanium nitride (TiN), tantalum nitride (TaN), tungsten nitride (WN), zirconium (Zr), tantalum (Ta), nickel (Ni), chromium (Cr), and titanium tungsten (TiW) for example. In some embodiments seed layers can have a thickness that is not less than 5 Å and in some embodiments, a seed layer can have a thickness that is not greater than 20 Å.

Use of high temperature deposition may require that often used photoresist be replaced with a material that is stable at higher temperatures. In some embodiments therefore photoresist (if utilized in a process scheme) can be replaced with materials such as oxide layers like $SiO_2$, $Al_2O_3$, or amorphous carbon for example. In some embodiments where it may be desired to form a disk of a NFT using high temperature deposition, photoresist that is typically utilized for formation of the disk can be replaced with illustrative oxides or amorphous carbon for example.

Use of high temperature deposition may advantageously render a post-deposition annealing step unnecessary. Films or layers deposited at high temperatures may have acceptable, or in some embodiments even advantageous or desirable properties without subjecting the film to a post-deposition annealing step.

Disclosed methods can also include a step or steps to form a peg of a NFT or a NFT from a high temperature deposited film. In some embodiments, a step of patterning can be included, a step of patterning can include one or more than one step and can utilize known patterning processes including, for example photolithography, etching, etc. In some embodiments, a step of forming a peg can also include using removal methods, such as etching, etc.

Disclosed methods can also include a step or steps to form a disk of a NFT or a NFT from a room temperature deposited or a high temperature deposited film. In some embodiments, a step of patterning can be included, a step of patterning can include one or more than one step and can utilize known patterning processes including, for example photolithography, etching, etc. In some embodiments where a high temperature deposition process is being utilized to form a disk of a NFT, a mold of a material that is more resistant to higher temperatures can be utilized. Illustrative materials can include, for example oxide layers such as $SiO_2$ or $Al_2O_3$ for example, or amorphous carbon, for example. In some embodiments, a step of forming a disk, whether done with photoresist or otherwise, can also include using removal methods, such as etching, etc.

Pegs, and/or other structures formed using disclosed methods can have various properties. In some embodiments, pegs and/or other structures formed using disclosed methods can have grain sizes that are larger in comparison to pegs and/or other structures formed by depositing materials at lower temperatures. In some embodiments, materials formed using disclosed methods can have average grain sizes that are not less than 20 nm, in some embodiments not less than 40 nm, in some embodiments not less than 50 nm, in some embodiments not less than 60 nm, or in some embodiments not less than 75 nm for example. In some embodiments, materials formed using high temperature deposition followed by an anneal can have an average grain size that is not less than 40 nm, in some embodiments not less than 50 nm, in some embodiments not less than 60 nm, or in some embodiments not less than 70 nm for example. It should be noted that materials deposited using methods other than disclosed herein often have average grain sizes from 10 to 20 nm, whereas materials deposited using high temperature deposition may have average grain sizes from 50 nm to 70 nm or even 100 nm, for example. It should be noted that materials deposited using methods other than disclosed herein and subsequently annealed often have average grain sizes from 30 to 40 nm, whereas materials deposited using high temperature deposition and then subsequently annealed may have average grain sizes from 70 nm to 80 nm, for example.

While the present disclosure is not so limited, an appreciation of various aspects of the disclosure will be gained through a discussion of the examples provided below.

EXAMPLES

High Temperature Deposition

Gold (Au) was deposited under different conditions and the grain sizes of the Au grains were determined using atomic force microscopy (AFM). Sample 1 was a 150 nm Au layer sputter deposited at room temperature without a seed layer; Sample 2 was a 150 nm Au layer sputter deposited at 225° C. without a seed layer; and Sample 3 was a 150 nm Au layer sputter deposited at 190° C. on a 5 Å Zr seed layer. The deposition parameters ranged from a power of 100-1500 W, a pressure of 0.2-5 mT, and an argon (Ar) gas flow of 20-200 sccm.

Figure 5C:
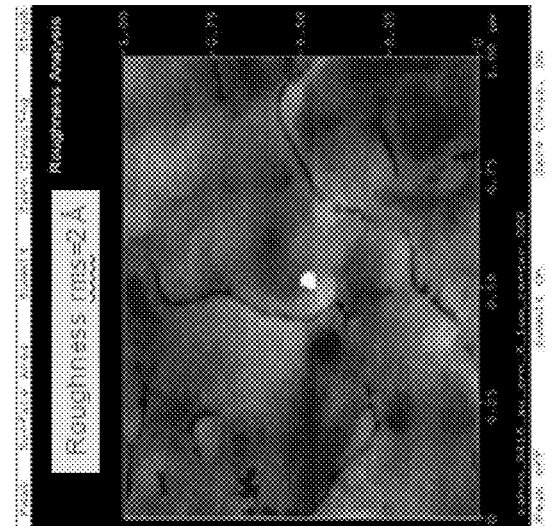
FIGS. 5A to 5C show AFM images of Au grains for a 150 nm Au layer sputter deposited at room temperature without a seed layer (FIG. 5A), a 150 nm Au layer sputter deposited at 225° C. without a seed layer (FIG. 5B), and a 150 nm Au layer sputter deposited at 190° C. on a 5 Å Zr seed layer (FIG. 5C).
Figure 5B:
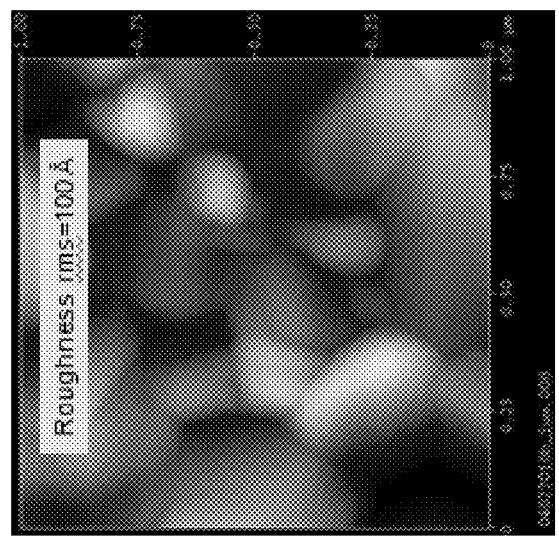
Figure 5A:
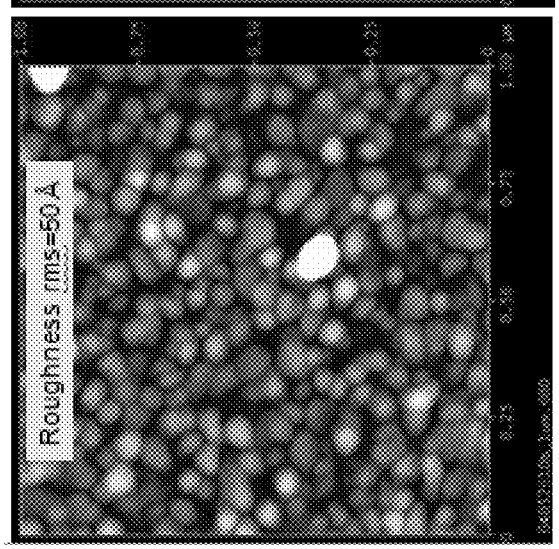

FIGS. 5A to 5C show AFM images of the Au grains for Sample 1 (FIG. 5A), Sample 2 (FIG. 5B), and Sample 3 (FIG. 5C). The room temperature deposited sample produced small grains having grain sizes from 20 to 50 nm, a large number of grain boundaries, and an average roughness (rms) of 50 Å (FIG. 5A). The sample deposited at 225° C. had grain sizes from 50 to 500 nm, less grain boundaries, and an average roughness (rms) of 100 Å (FIG. 5B). The surface of the Au film deposited at 225° C. had a random morphology and a higher roughness. The sample deposited at 190° C. on a 5 Å Zr seed layer had an average grain size from 50 to 200 nm and an average roughness (rms) of 2 Å. The surface of the sample deposited with the seed layer is also smoother, as is typical with use of a seed layer.

High Temperature Deposition Followed by Annealing

Au films were deposited with a 5 Å Zr seed layer at room temperature and at 190° C., and then oven annealed at 225° C. for about 3 hours, and then subsequently oven annealed at 300° C. for about 3 hours. The room temperature deposited Au had a size ranging from 10 nm to 90 nm with an average of 40 nm as deposited, a size ranging from 30 nm to 110 nm with an average of 62 nm after being annealed at 225° C. for 3 hours, and a size ranging from 30 nm to 130 nm with an average of 66 nm after being further annealed at 300° C. for 3 hours. The 190° C. deposited Au had a size ranging from 50 nm to 200 nm with an average of 77 nm as deposited, a size ranging from 50 nm to 180 nm with an average of 77 nm after being annealed at 225° C. for 3 hours, and a size ranging from 50 nm to 160 nm with an average of 70 nm after being further annealed at 300° C. for 3 hours. FIGS. 6A and 6B show AFM images of the room temperature deposited grains (FIG. 6A) and the 190° C. deposited grains (FIG. 6B).

As seen by comparing these results, the room temperature deposited films show tendencies towards increased grain sizes upon an increase in annealing temperature. The 190° C. deposited film has a stable grain size to being with and does not show further grain growth upon annealing.

Optical Properties

Au films were deposited with a 5 Å Zr seed layer at room temperature and at 190° C. The real part of the refractive index (n) and the imaginary part (κ) were measured. A figure of merit (FOM(eq6)) was also calculated as:

$$FOM(eq6) = 3\left|\frac{\varepsilon_1}{\varepsilon_2}\right|$$

where $\varepsilon_1 = n^2 - k^2$, $\varepsilon_2 = 2nk$. Table 1 below shows the results.

TABLE 1

| Sample | As deposited | | Annealed at 225° C. for 3 hr | | |
|---|---|---|---|---|---|
| | n | κ | n | κ | FOM |
| Room Temp | 0.236 | 5.14 | 0.163 | 5.32 | 48.9 |
| 190° Dep | 0.168 | 5.46 | 0.136 | 5.36 | 59.1 |

Figure 7:
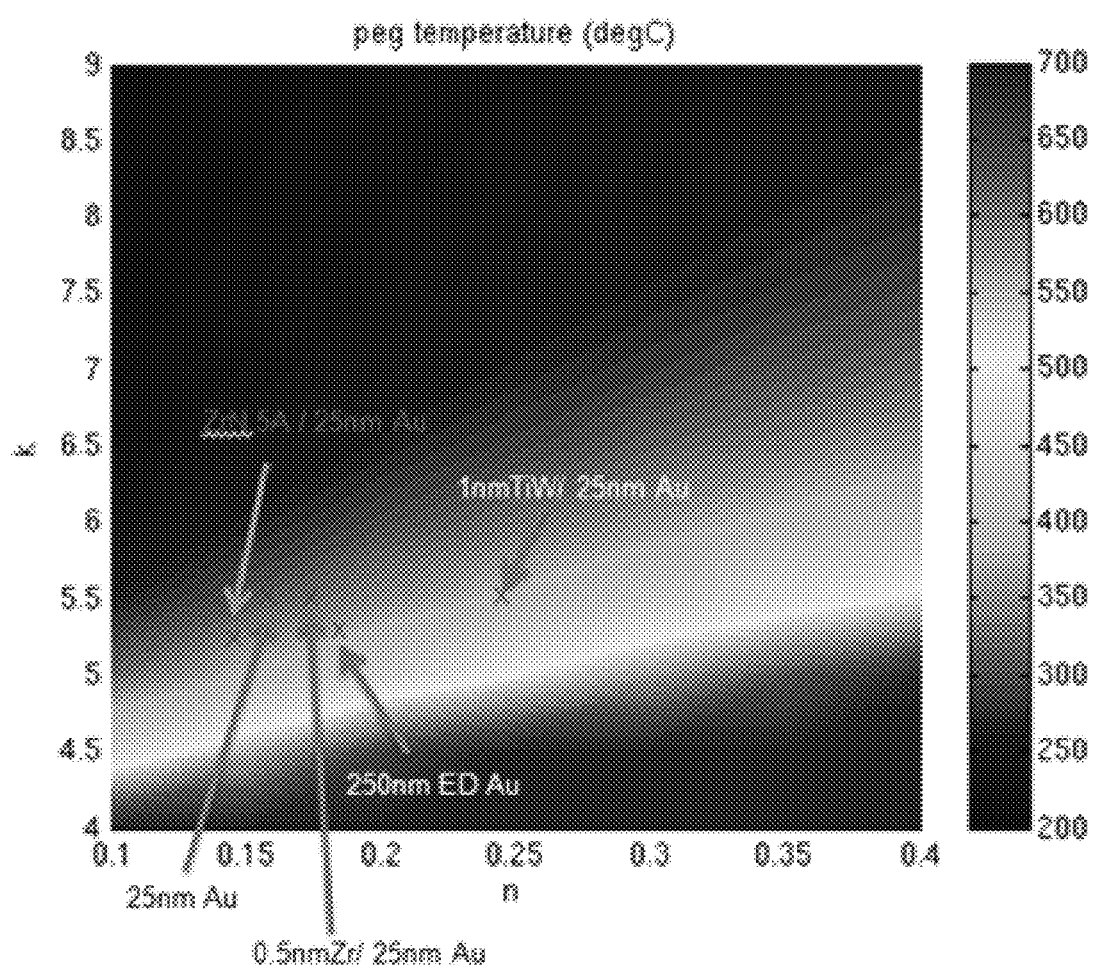
FIG. 7 shows a graph with the calculated temperature of a room temperature deposited peg and a high temperature deposited peg.

As seen, the film deposited at high temperatures had a higher FOM than the room temperature deposited and annealed film. This may be due to the combination of the plasmonic nature of the seed film and the ultra-smooth surface of the Au film formed by the high deposition method. Once the optical properties have been measured, the temperature of a peg formed from such a film functioning in a HAMR environment could then be modeled. FIG. 7 shows a graph with the calculated temperature of a room temperature deposited peg and a high temperature deposited peg.

Thermal Conductivities

The thermal conductivities of Au films having various thicknesses sputter deposited on a 5 Å Zr seed layer at room temperature and 280° C. were measured as grown and after a 3 hour anneal at 225° C. Table 2 shows the results. The unit of thermal conductivity in Table 2 is W/m-K.

TABLE 2

| Thickness | Room Temperature Deposition | | Deposition at 190° C. | |
|---|---|---|---|---|
| (nm) | As grown | Annealed | As grown | Annealed |
| 25 | 100 | 200 | 140 | 220 |
| 50 | 110 | 220 | 170 | 235 |
| 100 | 140 | 240 | 190 | 250 |
| 200 | 160 | 260 | 200 | 270 |
| 300 | 160 | 260 | 220 | 270 |

As seen from Table 2, the values of measured thermal conductivities are higher for high temperature deposited Au than room temperature deposited Au, and are close to the values for room temperature deposited after being annealed at 225° C. for 3 hours. This indicates that high temperature deposited films can provide thermal transport benefits similar to that of room temperature/annealed films.

Stress Relaxation Temperatures

Figure 8A:
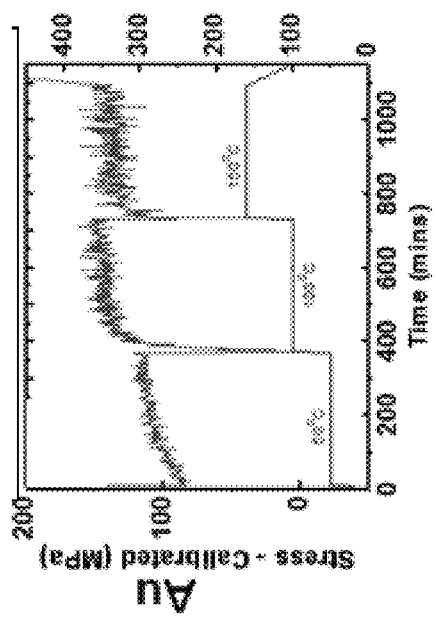
FIGS. 8A, 8B, and 8C show stress versus temperature measurements for 150 nm films sputter deposited on a 5 Å Zr seed layer at room temperature (FIG. 8A), at room temperature and annealed at 225° C. for 3 hours (FIG. 8B), and at 190° C.
Figure 8C:
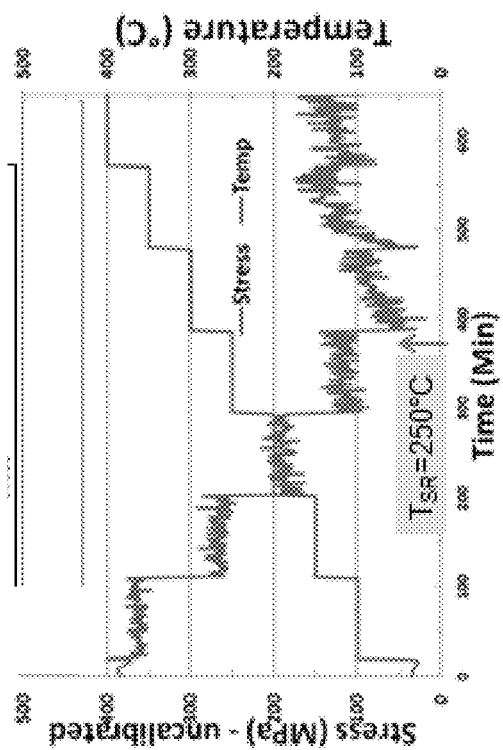
Figure 8B:
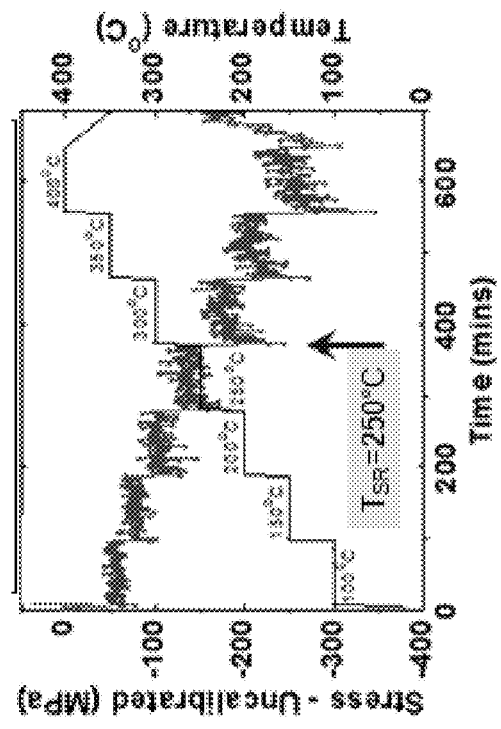

Stress versus temperature measurements were taken on 150 nm films sputter deposited on a 5 Å Zr seed layer at room temperature, at room temperature and annealed at 225° C. for 3 hours, and at 190° C. FIGS. 8A, 8B, and 8C show those results. FIG. 8A shows the stress vs temperature measurement of a room temperature deposited 150 nm Au film. As can be seen, stress relaxation happens upon heating at temperatures above just above room temperature, indicating the large thermal instability of this film. One way to pre-stabilize such stress would be via post deposition annealing. The stress versus temperature measurements of such a film are shown in FIG. 8B. As seen there, the stress relaxation temperature is beneficially increased to 250° C. FIG. 8C shows stress versus temperature measurement so the film deposited at 190° C. In this case the stress relaxation temperature is also 250° C. Thus, by depositing the film at a high temperature, there is no need to do post-deposition annealing. This could eliminate one step in manufacturing devices including such films.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of METHODS OF FORMING MATERIALS FOR AT LEAST A PORTION OF A NFT AND NFTS FORMED USING THE SAME are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method comprising:
    depositing a plasmonic material at a temperature of at least 150° C., the plasmonic material comprising gold (Au) and at least one of the following elements: Cu, Rh, Ru, Ag, Ta, Cr, Al, Zr, V, Pd, Ir, Co, W, Ti, Mg, Fe and Mo; and
    forming at least a peg of a near field transducer (NFT) from the deposited plasmonic material.

2. The method according to claim 1, wherein the plasmonic material is deposited at a temperature of at least 150° C.

3. The method according to claim 1, wherein the plasmonic material comprises Au and at least one of Cu, Rh, Ru, V and Zr.

4. The method according to claim 1, wherein the plasmonic material comprises Au and at least Rh.

5. The method according to claim 1 further comprising forming at least a disk of the NFT from a material deposited at a temperature of at least 150° C.

6. The method according to claim 5, wherein the material deposited to form the disk is deposited in a different step than the material deposited to form the peg.

7. The method according to claim 1, wherein the plasmonic material is sputter deposited.

8. The method according to claim 1, wherein the plasmonic material comprises from 0.5% to 30% of the at least one element.

9. The method according to claim 4, wherein the plasmonic material comprises not greater than 2% Rh.

10. The method according to claim 1, wherein the material is not annealed.

11. The method according to claim 1, wherein the peg has an average grain size of at least about 50 nm.

12. A near field transducer (NFT) comprising:
    a peg, the peg having an average grain size of not less than 75 nm and the peg comprises gold (Au) and at least one of the following elements: Cu, Rh, Ru, Ag, Ta, Cr, Al, Zr, V, Pd, Ir, Co, W, Ti, Mg, Fe and Mo.

13. The NFT according to claim 12, wherein the material making up the peg was deposited at a temperature of not less than 175° C.

14. The NFT according to claim 12, wherein the plasmonic material is deposited at a temperature of at least 180° C.

15. The NFT according to claim 12, wherein the peg comprises from 0.5% to 30% of the at least one element.

16. The NFT according to claim 12, wherein the peg comprises gold (Au) and not greater than 2% of Rh.

17. The NFT according to claim 12, wherein the NFT further comprises a disk having an average grain size of not less than 75 nm.

18. A method comprising:
    depositing a plasmonic material at a temperature of at least 150° C., the plasmonic material comprising gold (Au) and at least one of the following elements: Cu, Rh, Ru, Ag, Ta, Cr, Al, Zr, V, Pd, Ir, Co, W, Ti, Mg, Fe and Mo; and
    forming at least a peg of a near field transducer (NFT) from the deposited plasmonic material,
    wherein neither the deposited material is annealed nor the peg is annealed once formed, and the peg has an average grain size of not less than 50 nm.

19. The method according to claim 18, wherein the deposited plasmonic material comprises gold (Au) and Rh.

20. The method according to claim 18 further comprising forming at least a disk from a material deposited at a temperature of at least 150° C.

* * * * *